(12) United States Patent
Watanabe et al.

(10) Patent No.: US 9,423,555 B2
(45) Date of Patent: Aug. 23, 2016

(54) BACKLIGHT AND DISPLAY APPARATUS

(71) Applicant: Sharp Kabushiki Kaisha, Osaka-shi, Osaka (JP)

(72) Inventors: Hisashi Watanabe, Osaka (JP); Ryuzo Yuki, Osaka (JP); Takeshi Ishida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/429,864

(22) PCT Filed: Sep. 25, 2013

(86) PCT No.: PCT/JP2013/075833
§ 371 (c)(1),
(2) Date: Mar. 20, 2015

(87) PCT Pub. No.: WO2014/065063
PCT Pub. Date: May 1, 2014

(65) Prior Publication Data
US 2015/0277029 A1   Oct. 1, 2015

(30) Foreign Application Priority Data
Oct. 26, 2012   (JP) ................. 2012-236347

(51) Int. Cl.
*F21V 8/00* (2006.01)
*G02F 1/1333* (2006.01)
*G02F 1/1335* (2006.01)

(52) U.S. Cl.
CPC ............ *G02B 6/0088* (2013.01); *G02B 6/005* (2013.01); *G02F 1/133308* (2013.01); *G02F 1/133615* (2013.01); *G02F 2001/133314* (2013.01)

(58) Field of Classification Search
CPC .................. G02F 1/133604; G02F 1/133608; G02F 1/133615; G02F 2001/133314; G02F 1/13306; G02F 1/133308; G02F 2001/133317; G02F 2001/13332; G02B 6/007; G02B 6/0073; G02B 6/0031; G02B 6/0035; G02B 6/0096; G02B 6/0068; G02B 6/0088; G02B 6/0071; G02B 6/009; G02B 6/0091; G02B 6/0061; G02B 6/0086; F21Y 2101/02
See application file for complete search history.

(56) References Cited

U.S. PATENT DOCUMENTS 7,093,967 B2 * 8/2006 Chang .................. G02B 6/0086
362/560
7,156,534 B2 * 1/2007 Hwang ............. G02F 1/133608
362/559

(Continued)

FOREIGN PATENT DOCUMENTS

| CN | 102155714 A | | 8/2011 |
|----|-------------|---|--------|
| JP | 2001210129 A | * | 8/2001 |
| JP | 2008-046266 A | | 2/2008 |

*Primary Examiner* — Hargobind S Sawhney
(74) *Attorney, Agent, or Firm* — Keating & Bennett, LLP

(57) ABSTRACT

In a backlight (20) including a frame (22) having an opening (22*a*), and a light guide plate assembly (23) disposed inside the frame (22) and having a light guide plate (24) and a light source (25), the backlight being configured to emit illumination light through the opening (22*a*), the frame (22) is formed by bending a metal plate and includes a bottom surface portion (22*b*) facing a rear surface of the light guide plate (24), a peripheral surface portion (22*c*) standing on a peripheral edge of the bottom surface portion (22*b*), and an upper surface portion (22*d*) bent from an upper end of the peripheral surface portion (22*c*) to form a peripheral edge of the opening, and an outer shape of the light guide plate assembly (23) is smaller than the opening (22*a*).

7 Claims, 6 Drawing Sheets

(56) References Cited

U.S. PATENT DOCUMENTS

| | | | | |
|---|---|---|---|---|
| 7,583,353 B2* | 9/2009 | Kujiraoka | G02B 6/0088 | 349/187 |
| 7,929,073 B2* | 4/2011 | Hsu | G02F 1/133308 | 349/58 |
| 7,965,347 B2* | 6/2011 | Ono | H05K 5/02 | 349/58 |
| 2007/0242476 A1* | 10/2007 | Ida | G02B 6/0088 | 362/611 |
| 2008/0129927 A1* | 6/2008 | Hamada | G02B 6/0036 | 349/65 |
| 2008/0239199 A1* | 10/2008 | Wakaki | G02B 6/0088 | 349/62 |
| 2008/0285290 A1* | 11/2008 | Ohashi | G02B 6/0085 | 362/373 |
| 2008/0303979 A1* | 12/2008 | Shimizu | F21V 7/05 | 349/65 |
| 2009/0067112 A1* | 3/2009 | Takabayashi | G02F 1/13452 | 361/220 |
| 2009/0160745 A1* | 6/2009 | Kim | G02B 6/0085 | 345/87 |
| 2010/0290246 A1* | 11/2010 | Kim | G02B 6/002 | 362/602 |
| 2011/0102726 A1* | 5/2011 | Nobeoka | G02F 1/133308 | 349/150 |
| 2011/0242686 A1* | 10/2011 | Watanabe | G02B 17/0884 | 359/804 |

* cited by examiner

BACKLIGHT AND DISPLAY APPARATUS

TECHNICAL FIELD

The present invention relates to a backlight including a light guide plate disposed in a frame, and a display apparatus including the backlight.

BACKGROUND ART

A conventional display apparatus is disclosed in Patent Literature 1. In the conventional display apparatus, a backlight is disposed behind a liquid crystal panel. The backlight is configured such that a metal frame holds a light guide plate assembly that is configured such that a plurality of light sources are disposed on a peripheral surface of a light guide plate formed of a transparent member in a rectangular shape in plan view. Light emitted from the light sources is incident on the light guide plate to be guided to be emitted from a front surface of the light guide plate as illumination light which illuminates the liquid crystal panel.

The frame has a bottom surface portion facing a rear surface of the light guide plate, peripheral surface portions standing on a peripheral edge of the bottom surface portion on four sides thereof, and upper surface portions bent inwardly from upper ends of the peripheral surface portions. One of the peripheral surface portions is pivotably supported with respect to the bottom surface portion, and the other peripheral surface portions on the other three sides are integrally formed with the bottom surface portion by bending a metal plate. A pair of opposing peripheral surface portions one of which is the peripheral surface portion pivotably supported on the bottom surface portion has a greater height from the bottom surface portion than the other opposing pair of peripheral surface portions orthogonal to the former pair.

The light guide plate assembly is inserted from an end surface opened by rotation of the pivotable peripheral surface portion and slid between two opposing peripheral surface portions into a position where three of the upper surface portions cover the light guide plate assembly. Next, the opened one peripheral surface portion is rotated back to the position where it stands, so that the light guide plate assembly is covered by the four upper surface portions. Then, the liquid crystal panel is slid and inserted between the two opposing peripheral surface portions having the greater height. Thereby, the liquid crystal panel and the backlight are integrally held by the frame.

CITATION LIST

Patent Literature

Patent Literature 1: JP-A-2008-46266 (Pages 6 to 8, FIG. 9)

SUMMARY OF INVENTION

Technical Problem

Display apparatuses are used in portable terminals, for example, and demand is high for slimming down of the apparatuses and for achieving a narrower frame to reduce space around the display region. According to the above-described conventional display apparatus, however, the metal frame becomes liable to be bent if it is formed so thin as to achieve such a reduced thickness and a narrow frame. This makes it difficult to slide and insert the light guide plate assembly in the frame, as a result of which the man-hours in production is disadvantageously increased.

What is worse, the bent frame and the light guide plate may slide against each other while the light guide plate assembly is being inserted, and this may cause a scratch on the light guide plate, or may break an edge of the light guide plate, leaving a fragment of the broken edge inside the apparatus. As a result, there may occur a problem where a bright or black point is generated in the illumination light so that uniform illumination light cannot be obtained.

An object of the present invention is to provide a backlight capable of reducing the man-hours in production and obtaining uniform illumination light, and a display apparatus including the backlight.

Solution to Problem

To achieve the above object, according to one aspect of the present invention, in a backlight including a frame having an opening formed in an upper surface thereof and having a substantially rectangular plan shape, and a light guide plate assembly disposed inside the frame and including a light guide plate and a light source fitted to a light incident surface formed in a peripheral surface of the light guide plate, the backlight being configured to guide light incident on the light guide plate from the light source and emit illumination light through the opening, the frame is formed by bending a metal plate and includes a bottom surface portion facing a rear surface of the light guide plate, a peripheral surface portion standing on a peripheral edge of the bottom surface portion, and an upper surface portion bent from an upper end of the peripheral surface portion to form a peripheral edge of the opening, and an outer shape of the light guide plate assembly is smaller than the opening.

According to this configuration, in the frame formed from a metal plate, the peripheral surface portion and the upper surface portion are formed by bending the metal plate. An inner edge of the upper surface portion forms a peripheral edge of the opening, and the light guide plate assembly is installed to be accommodated in the frame through the opening. Light emitted from the light source is incident on the light guide plate through the light incident surface and is guided though the light guide plate, to be emitted as illumination light through the opening.

According to another aspect of the present invention, in the backlight configured as described above, an optical sheet is provided on the light guide plate, and an upper surface of the optical sheet is disposed below a lower surface of the upper surface portion.

According to another aspect of the present invention, in the backlight configured as described above, the light guide plate and the optical sheet each have a projection portion projecting from a peripheral surface thereof orthogonal to the light incident surface, the upper surface portion has a fitting groove that fits in the projection portion, and the projection portion inserted through the fitting groove is disposed to face the upper surface portion by sliding the light guide plate assembly.

According to another aspect of the present invention, in the backlight configured as described above, a plurality of projection portions are provided as the projection portion, and the plurality of projection portions are asymmetrically arranged with respect to a center line orthogonal to the light incident surface of the light guide plate.

According to another aspect of the present invention, in the backlight configured as described above, the frame has an inner peripheral portion bent downwardly from the inner edge of the upper surface portion.

According to another aspect of the present invention, in the backlight configured as described above, the upper surface portion is formed on four sides of the frame.

According to another aspect of the present invention, in a backlight including a frame having an opening formed in an upper surface thereof and having a substantially rectangular plan shape and a light guide plate assembly that is disposed inside the frame and has a light guide plate and a light source fitted to a light incident surface formed in a peripheral surface of the light guide plate, the backlight being configured to guide light incident on the light guide plate from the light source and emit illumination light through the opening, the frame is formed by bending a metal plate and includes a bottom surface portion facing a rear surface of the light guide plate, a peripheral portion standing on a peripheral edge of the bottom surface portion, and an upper surface portion bent from an upper end of the peripheral surface portion to form a peripheral edge of the opening, the upper surface portion is formed on four sides of the frame, a width of the light guide plate between two sides orthogonal to the light incident surface is greater than a width of the opening between the two sides, and the light guide plate assembly is installed to be accommodated in the frame by curving the frame.

According to another aspect of the present invention, in the backlight configured as described above, the metal plate is 0.03 mm to 0.2 mm thick.

According to another aspect of the present invention, a display apparatus includes the backlight configured as described above, and a display panel disposed to face the opening.

According to another aspect of the present invention, in the display apparatus including the backlight configured as described above and a display panel disposed to face the opening, the display panel is disposed to face the opening with a double-sided adhesive tape affixed to the upper surface portion. Here, an outer periphery of the fitting groove is disposed inwardly from an outer periphery of the double-sided adhesive tape.

According to another aspect of the present invention, in the display apparatus configured as described above, a transparent member a peripheral portion of which is formed as a curved surface is disposed on an upper surface of the display panel.

Advantageous Effects of Invention

According to the present invention, a frame formed from a metal plate includes a bottom surface portion, a peripheral surface portion standing on a peripheral edge of the bottom surface portion, and an upper surface portion bent from an upper end of the peripheral surface portion to form a peripheral edge of an opening, and an outer shape of a light guide plate assembly is formed smaller than the opening. This makes it possible to easily install the light guide plate assembly inside the frame through the opening. Thus, it is possible not only to reduce the man-hours in production of a backlight and a display apparatus, but also to avoid sliding of the light guide plate assembly and the frame against each other and obtain uniform illumination light.

Furthermore, according to the present invention, a frame formed from a metal plate includes a bottom surface portion, a peripheral surface portion standing on a peripheral edge of the bottom surface portion, and an upper surface portion bent from an upper end of the peripheral surface portion to form a peripheral edge of the opening on four sides thereof, and a width of a light guide plate between two sides orthogonal to a light incident surface is greater than that of the opening, and the light guide plate assembly is installed to be accommodated in the frame by curving the frame. This makes it possible to easily install the light guide plate assembly in the frame via the opening by pushing the light guide plate assembly into the frame via the opening. Thus, it is possible not only to reduce the man-hours in production of a backlight and a display apparatus, but also to avoid sliding of the light guide plate assembly and the frame against each other and obtain uniform illumination light.

DESCRIPTION OF EMBODIMENTS

First Embodiment

Figure 1:
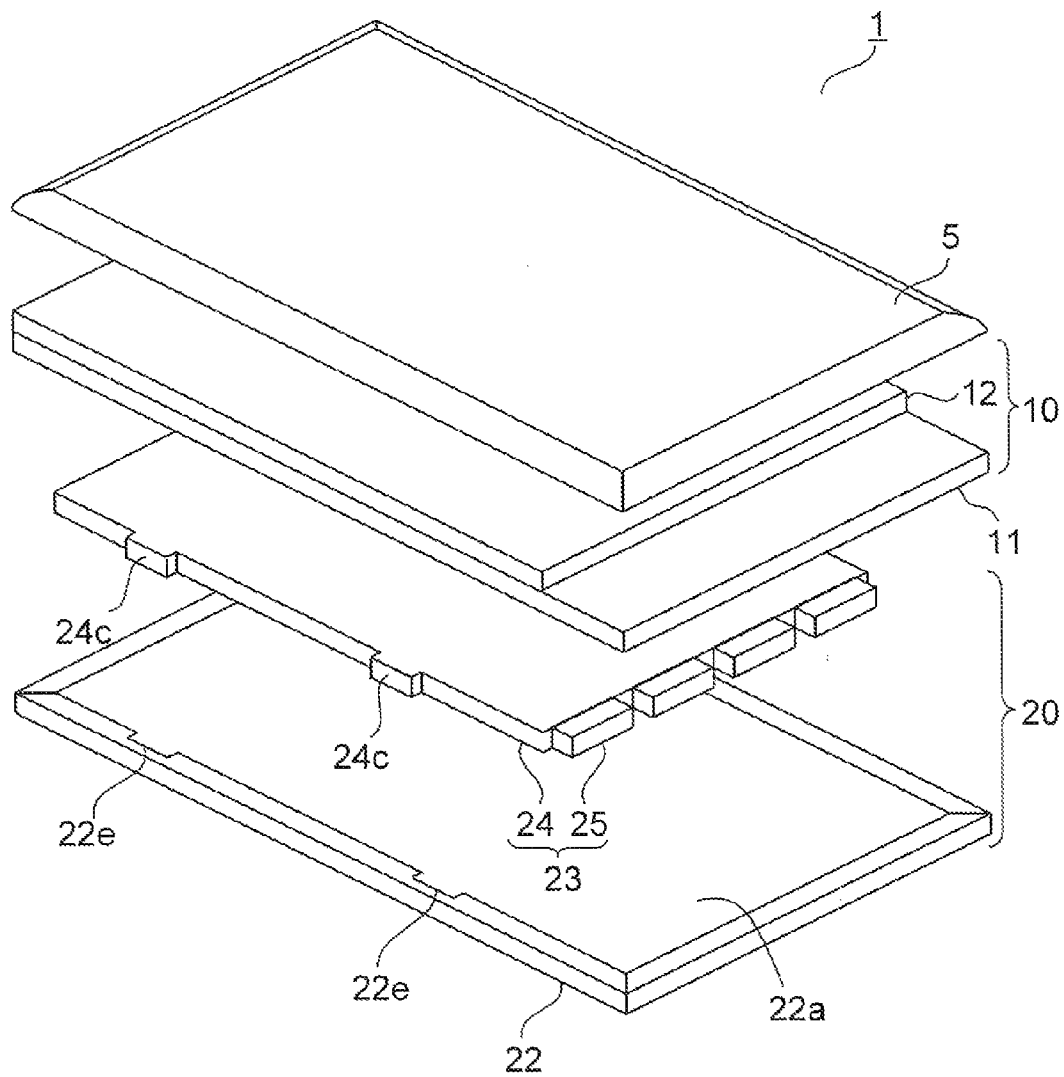
FIG. 1 is an exploded perspective view showing a display apparatus according to a first embodiment of the present invention.
Figure 2:
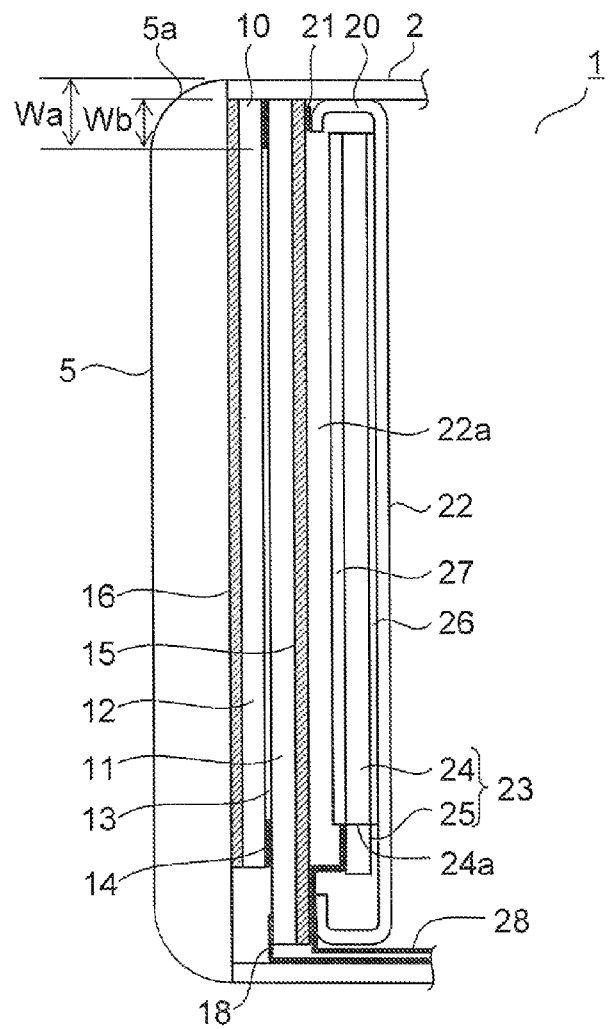
FIG. 2 is a side sectional view showing the display apparatus according to the first embodiment of the present invention.
Figure 3:
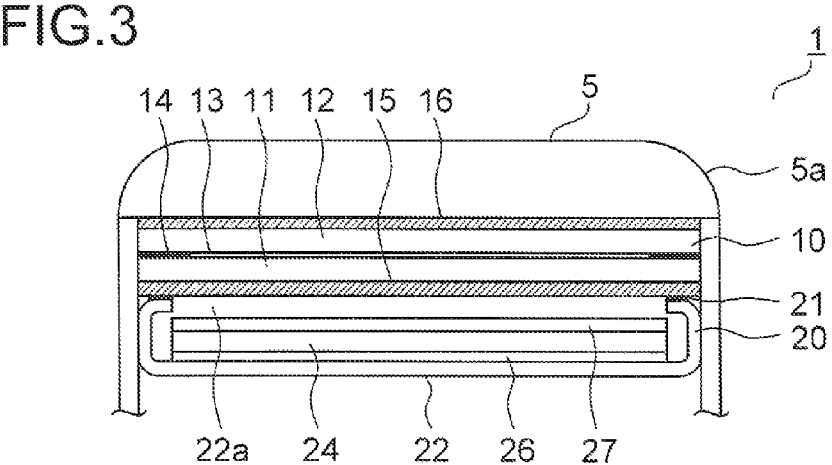
FIG. 3 is a front sectional view showing the display apparatus according to the first embodiment of the present invention.

With reference to the accompanying drawings, embodiments of the present invention will be described below. FIG. 1, FIG. 2, and FIG. 3 are an exploded perspective view, a side sectional view, and a front sectional view, respectively, showing a display apparatus according to a first embodiment. A display apparatus 1 is held in a housings 2 of a portable terminal or the like (unillustrated in a FIG. 1), and includes a display panel 10 rectangular shaped in plan view, a backlight 20, and a transparent member 5. The display panel 10 is formed of a liquid crystal panel, etc., and the backlight 20 is disposed to face a rear surface of the display panel 10. Furthermore, inside the housing 2, at a side behind a rear surface of the backlight 20, a circuit board, a battery, etc. (all unillustrated) are accommodated.

In the display panel 10, a pixel substrate 11 on which a pixel electrode is formed and a counter substrate 12 on which a counter electrode is formed are disposed to face each other. Between the pixel substrate 11 and the counter substrate 12, liquid crystal 13 is sealed by a sealing seal 14 disposed on a peripheral portion. A sum of a width Wb of the sealing seal 14 and a plate thickness of the housing 2 determine a frame width Wa of the display apparatus 1. The pixel substrate 11 and the counter substrate 12 are connected to the circuit board via an FPC 18. On a rear surface of the pixel substrate 11 and on an upper surface of the counter substrate 12, optical sheets 15 and 16 are disposed, respectively, and the optical sheets 15 and 16 are formed of, for example, a polarizing plate and a retardation film, respectively.

The transparent member 5 is formed of resin, glass, etc., and is disposed on an upper surface of the display panel 10 by support of the housing 2. A peripheral portion of the transparent member 5 is formed as a curved surface portion 5*a*. With this arrangement, when the display apparatus 1 is viewed from the front, light is refracted through the curved surface portion 5*a* of the transparent member 5, and it makes the frame width Wa of the display apparatus 1 appear to be thinner than it actually is. It is desirable that a thickness "t" of the transparent member 5 and a curvature radius "r" of the curved surface portion 5*a* have a relationship represented by the following equations (1) and (2), where "Wa" indicates the frame width of the display apparatus 1.

$$t = 2.7Wa \text{ to } 4.6Wa \quad (1)$$

$$r = 1.6Wa \text{ to } 4.2Wa \quad (2)$$

Figure 4:
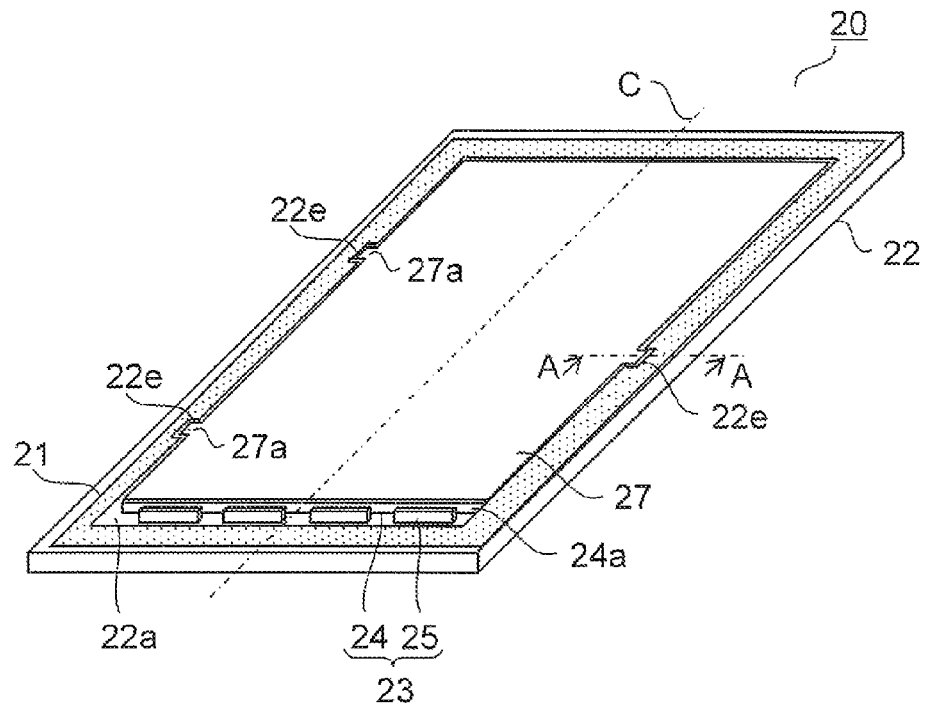
FIG. 4 is a perspective view showing a backlight of the display apparatus according to the first embodiment of the present invention.
Figure 5:
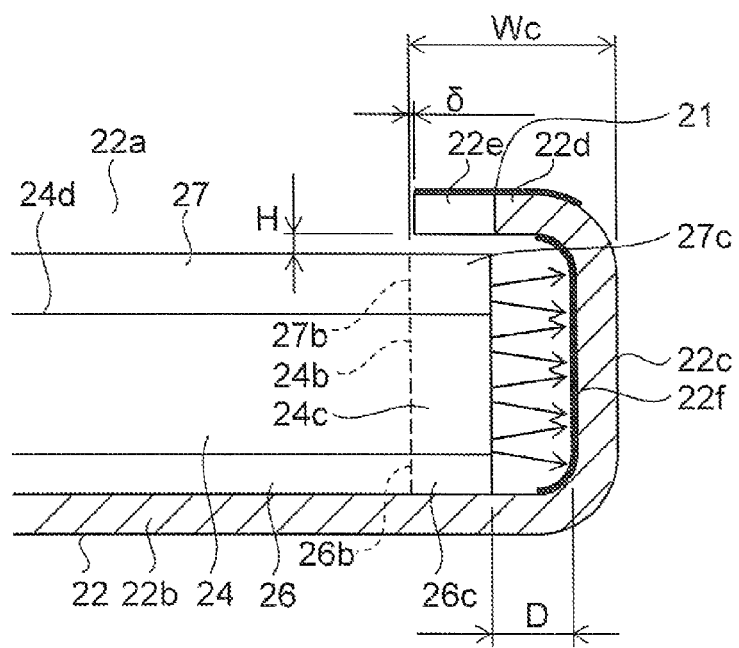
FIG. 5 is a sectional view taken along line A-A of FIG. 4.

FIG. 4 shows a perspective view of the backlight 20. FIG. 5 shows a front sectional view taken along line A-A of FIG. 4. The backlight 20 is configured as an edge-light backlight where a light source 25 is disposed on and facing a peripheral surface of a light guide plate 24 having a thin-plate shape, and the backlight 20 is covered by a frame 22 which is formed from a plate of a metal such as stainless steel. The frame 22, where an opening 22*a* is formed in an upper surface thereof, includes a bottom surface portion 22*b*, a peripheral surface portion 22*c*, and an upper surface portion 22*d*, which are formed by bending the metal plate.

The bottom surface portion 22*b* is formed in a rectangular shape so as to cover a rear surface of the light guide plate 24. The peripheral surface portion 22*c* stands on a peripheral edge of the bottom surface portion 22*b* on four sides thereof to form a peripheral surface of the backlight 20. The upper surface portion 22*d* is formed by bending an upper end of the peripheral surface portion 22*c* to cover a peripheral portion of an upper surface of the backlight 20, thereby forming a peripheral edge of the opening 22*a*. The backlight 20 is united with the display panel 10 with a double-sided adhesive tape 21 affixed to the upper surface portion 22*d*.

On an inner surface of the peripheral surface portion 22*c*, a high-reflection finish is applied by forming a reflection layer 22*f*. The reflection layer 22*f* is formed as a thin film of aluminum, silver, etc., on the frame 22 by a method such as sputtering and plating. The reflection layer 22*f* may be formed by white ink printing. Or, the reflection layer 22*f* may be formed by placing a thin sheet with a high-reflection finish. Or, a high-reflection finish such as a mirror finish may be applied to an inner surface of the frame 22 to obtain a structure where the inner surface of the frame 22 functions as a reflection layer as well. The reflection layer 22*f* (high-reflection finish) reflects light leaked from the light guide plate 24 or from a later-described optical sheet 27, and this helps achieve an improved light usage efficiency to make the illumination light brighter.

Here, the material of the frame 22 may be a resin if a highly light-blocking reflection layer can be formed with the resin. Note that, however, since general-purpose resins such as polycarbonate and ABS may lose strength and become weak, it is desirable to form the frame 22 of a high-strength resin or a metal.

The light source 25 is constituted by a plurality of LEDs facing a light incident surface 24 of the light guide plate 24; the light incident surface 24*a* is one of two shorter portions of the peripheral surface of the light guide plate 24 which is rectangular. Light is incident on the light guide plate 24 through the light incident surface 24*a* to be guided through the light guide plate 24, and emitted through a light emission surface 24*d* facing the opening 22*a* formed in the upper surface. Thereby, the display panel 10 is illuminated by illumination light emitted from the opening 22*a*. If a sufficient amount of light cannot be obtained by forming the light incident surface 24*a* at only one side of the light guide plate 24, light incident surfaces 24*a* may be formed at two opposing shorter sides of the light guide plate 24 and the light source 25 may be disposed on and facing the two light incident surfaces 24*a*. Or, the light source 25 may be disposed on and facing one or both of two longer sides of the light guide plate 24.

The light guide plate 24 and the light source 25 are integrated by a holding member (unillustrated) to form a light guide plate assembly 23, which is accommodated inside the frame 22. The light source 25 is connected to the circuit board via an FPC 28 (see FIG. 2) which is laid over the double-sided adhesive tape 21.

If a problem is caused by increased thickness of the portion where the FPC 28 and the double-sided adhesive tape 21 overlap with each other, the double-sided adhesive tape 21 may be omitted from the side where the FPC 28 is laid. Or, the peripheral surface portion 22*c* of the frame 22 may be omitted on the side where the FPC 28 is laid, such that the peripheral surface portion 22*c* is formed on the other three sides, excluding the side where the light source 25 is disposed. Or, an opening through which to pass the FPC 28 may be formed in part of the peripheral portion 22 of the frame 22.

The light guide plate 24 has a reflection sheet 26 disposed on its rear surface, and has an optical sheet 27 or a plurality of optical sheets 27 formed of a diffusion sheet, a prism sheet, etc. disposed on its upper surface. The reflective sheet 26 and the optical sheet 27 are formed in substantially the same shape as the light guide plate 24 in plan view. The reflection sheet 26 and the optical sheet 27 may be affixed to the light guide plate 24 with a double-sided adhesive tape.

A plurality of fitting grooves 22*e* are formed in the upper surface portion 22*d* of the frame 22. A plurality of projection portions 24*c* that fit in the fitting grooves 22*e* are formed to project from a peripheral surface 24*b* of the light guide plate 24. Likewise, a plurality of projection portions 26*c* that fit in the fitting grooves 22*e* are formed to project from a peripheral surface 26*b* of the reflection sheet 26. A plurality of projection portions 27*c* that fit in the fitting grooves 22*e* are formed to project from a peripheral surface 27*b* of the optical sheet 27. The projection portions 24*c*, 26*c*, and 27*c* project from two opposite portions of the peripheral surfaces 24*b*, 26*b*, and 27*b* that are orthogonal to the light incident surface 24*a* of the light guide plate 24, respectively, and the projection portions 24*c*, 26*c*, and 27*c* are asymmetrically arranged with respect to a center line C, which is orthogonal to the light incident surface 24*a*.

An outer periphery of each of the fitting grooves 22*e* is disposed inwardly from an outer periphery of the double-sided adhesive tape 21 affixed to the upper surface portion 22*d*. Thereby, it is possible to prevent light leakage through the fitting grooves 22*e*.

An outer shape of the light guide plate assembly 23 including the light guide plate 24 is formed smaller than the opening 22a, and the light guide plate assembly 23 is installed to be accommodated in the frame 22 through the opening 22a. That is, an outer surface of the light source 25 is disposed inwardly from the peripheral edge of the opening 22a on one side, and on the other three sides, the peripheral surface 24b of the light guide plate 24 is disposed inwardly from the peripheral edge of the opening 22a. The projection portions 24c are each disposed inwardly from the outer periphery of a corresponding one of the fitting grooves 22e. Here, since the fitting grooves 22e and the projection portions 24c are asymmetrically arranged with respect to the center line C, the light guide plate assembly 23 is prevented from being inserted in a wrong direction, that is, for example, upside down.

Likewise, the reflection sheet 26 and the optical sheet 27 having substantially the same shape as the light guide plate 24 are also installed to be accommodated in the frame 22 through the opening 22a. A clearance δ formed between the outer shape of the light guide plate assembly 23 and the opening 22a is, for example, about several tens of micrometers.

A frame width Wc of a peripheral portion of the backlight 20 is determined by a width of the upper surface portion 22d of the frame 22 and formed such that the frame width Wc is narrower than a width Wb of the sealing seal 14 (refer to FIG. 2). For this reason, the frame 22 is formed from a thin metal plate having a thickness of 0.03 mm to 0.2 mm. If the thickness of the metal plate is smaller than 0.03 mm, it is impossible to secure sufficient strength of the frame 22, and thus it becomes impossible to hold the backlight 20. If the thickness of the metal plate is greater than 0.2 mm, it becomes difficult to reduce the frame width Wc.

As a result, the frame 22 becomes liable to be curved, but since the outer shape of the light guide plate assembly 23 is smaller than the opening 22a, the light guide plate assembly 23 can be installed to be accommodated in the frame 22 with ease.

An upper surface of the optical sheet 27 is disposed below a lower surface of the upper surface portion 22d of the frame 22, and outer edges of the optical sheet 27, the light guide plate 24, and the reflection sheet 26 (outer surfaces of the projection portions 27c, 24c, and 26c) face the peripheral surface portion 22c of the frame 22. A distance H between the upper surface of the optical sheet 27 and the lower surface of the upper surface portion 22d is formed to be about 0.05 mm, for example. A clearance D of about 0.2 mm is provided between the peripheral surface portion 22c and the outer edges of the optical sheet 27, the light guide plate 24, and the reflection sheet 26.

Since the optical sheet 27 and the light guide plate 24 are formed of resin, they expand due to heat generated in the light source 25, for example. Thus, the clearance D helps prevent the optical sheet 27 from being curved, lifted up, and wrinkled, for example, by thermal expansion. The clearance D also helps prevent the frame 22 from being deformed by thermal expansion of the light guide plate 24.

Here, the upper surface of the optical sheet 27 is disposed below the lower surface of the upper surface portion 22d. Thus, it is possible to make the frame width Wc of the backlight 20 smaller than in a case where the clearance D is provided by the optical sheet 27 facing an inner peripheral surface of the upper surface portion 22d.

According to the present embodiment, in the frame 22 formed from a metal plate, the peripheral surface portion 22c stands on the peripheral edge of the bottom surface portion 22b and the upper end of the peripheral surface portion 22c is bent to form the upper surface portion 22d that forms the peripheral edge the opening 22a, and the outer shape of the light guide plate assembly 23 is formed smaller than the opening 22a. This makes it easy to install the light guide plate assembly 23 in the frame 22 through the opening 22a. Thus, it is possible not only to reduce the man-hours in production of the backlight 20 and the display apparatus 1, but also to avoid sliding of the light guide plate assembly 23 and the frame 22 against each other and obtain uniform illumination light.

Furthermore, since the upper surface of the optical sheet 27 on the light guide plate 24 is disposed below the lower surface of the upper surface portion 22d, it is possible to reduce the frame width Wc of the backlight 20.

Furthermore, since the projection portions 24c, 26c, and 27c are asymmetrically arranged with respect to the center line C which is orthogonal to the light incident surface 24a of the light guide plate 24, it is possible to prevent the light guide plate assembly 23 from being inserted in a wrong direction.

Furthermore, in contrast to the conventional example, no portion of the peripheral surface portion is formed to be pivotably supported with respect to the bottom surface portion, and the peripheral surface portion 22c and the upper surface portion 22d are formed by bending the metal plate on the four sides of the frame 22. This makes it possible to simplify the frame 22, and thus to further reduce the cost of the backlight 20.

Furthermore, since the thickness of the metal plate forming the frame 22 is 0.03 mm to 0.2 mm, it is possible both to secure the strength of the backlight 20 and to achieve a narrower frame.

Furthermore, since the outer peripheries of the fitting grooves 22e provided in the upper surface portion 22d are disposed inwardly from the outer periphery of the double-sided adhesive tape 21, it is possible to prevent leakage of light through the fitting grooves 22e.

Furthermore, since the transparent member 5, the peripheral portion of which is formed as a curved portion by providing the curved surface portion 5a, is disposed on the upper surface of the display panel 10, it is possible to cause the display apparatus 1 to appear to have a frame of a width narrower than the actual frame width Wa, as seen from the front side.

Second Embodiment

Figure 6:
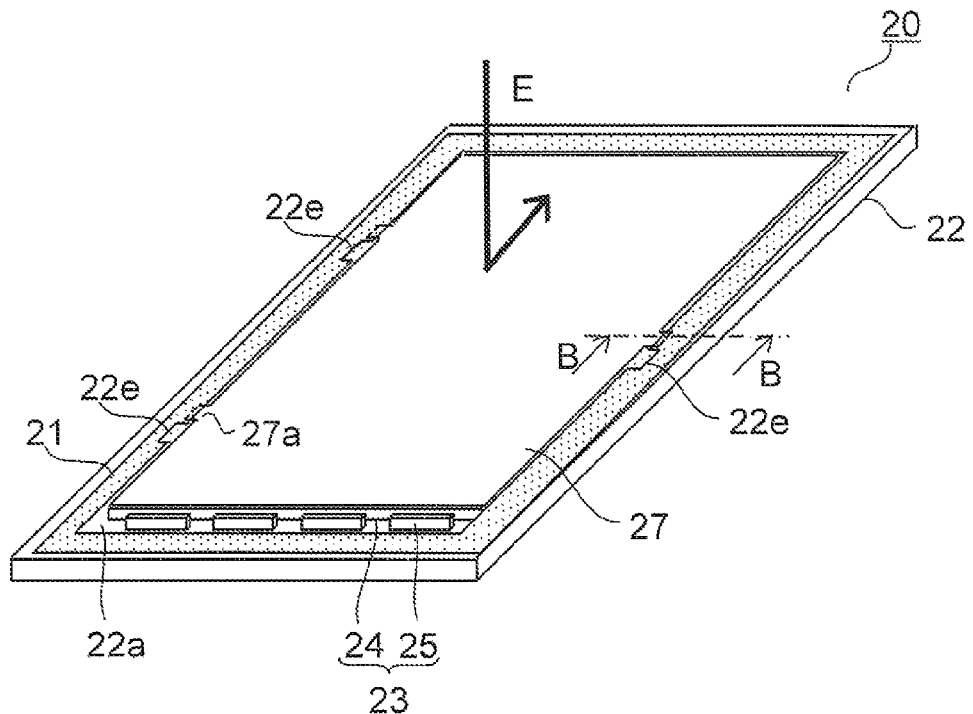
FIG. 6 is a perspective view showing a backlight of a display apparatus according to a second embodiment of the present invention.
Figure 7:
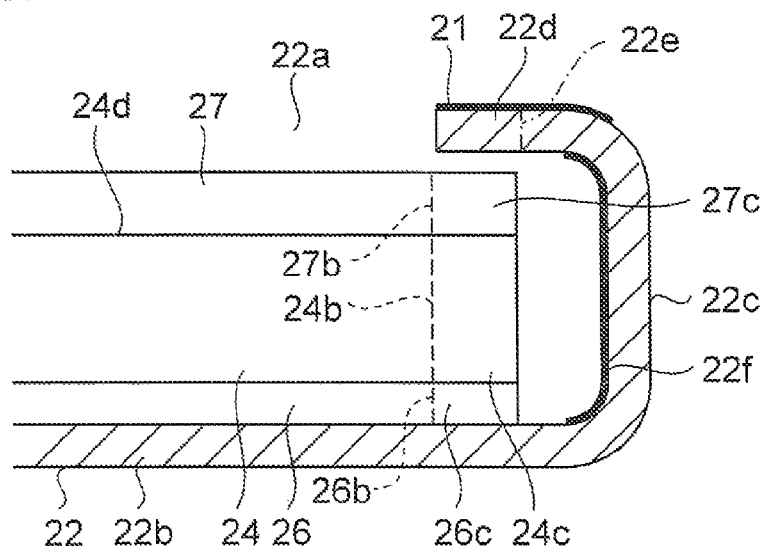
FIG. 7 is a sectional view taken along line B-B of FIG. 6.

FIG. 6 shows a perspective view of a backlight 20 of a display apparatus 1 according to a second embodiment. FIG. 7 shows a front sectional view taken along line B-B of FIG. 6. For convenience of description, such portions as find their counter parts in the first embodiment illustrated in FIGS. 1 to 5 referred to above are denoted by common reference signs. The present embodiment differs from the first embodiment in size of the opening 22a of the frame 22 and in arrangement of the fitting grooves 22e. In the other respects, the present embodiment is the same as the first embodiment.

The opening 22a of the frame 22 is formed to be longer than the light guide plate assembly 23 in a longitudinal direction by the length of the fitting groove 22e (for example, 3 mm). As indicated by an arrow E, the light guide plate assembly 23 is inserted in the frame with the projection portions 24c inserted in the fitting grooves 22e, and then the light guide plate assembly 23 is slid inside the frame 22 in a direction orthogonal to the light incident surface 24a. Likewise, the reflection sheet 26 and the optical sheet 27 are also inserted in the frame 22 from above, and slid in the direction orthogonal to the light incident surface 24a. The light guide plate assembly 23 and so forth slid inside the frame 22 into predetermined positions are restricted from further sliding by an engagement member, an adhesive tape, etc.

Thereby, the upper surface portion 22d of the frame 22 is disposed to face the projection portions 24c, 26c, and 27c, and covers above the projection portions 24c, 26c, and 27c. Thus, it is possible to prevent the light guide plate assembly 23, the reflection sheet 26, and the optical sheet 27 from coming off during the production steps.

Here, since the light guide plate assembly 23, the reflection sheet 26, and the optical sheet 27 slide only a small distance (3 mm, for example), it is possible to reduce risk of them suffering scratches caused by sliding against the frame 22.

According to the present embodiment, it is possible to achieve the same advantage as the first embodiment. Furthermore, the projection portions 24c, 26c, and 27c are inserted through the fitting grooves 22e to be disposed facing the upper surface portion 22d by sliding of the light guide plate assembly 23 and so forth. Thereby, it is possible to prevent the light guide plate assembly 23, the reflection sheet 26, and the optical sheet 27 from coming off during the production steps, and to reduce the man-hours in production of the backlight 20.

Third Embodiment

Figure 8:
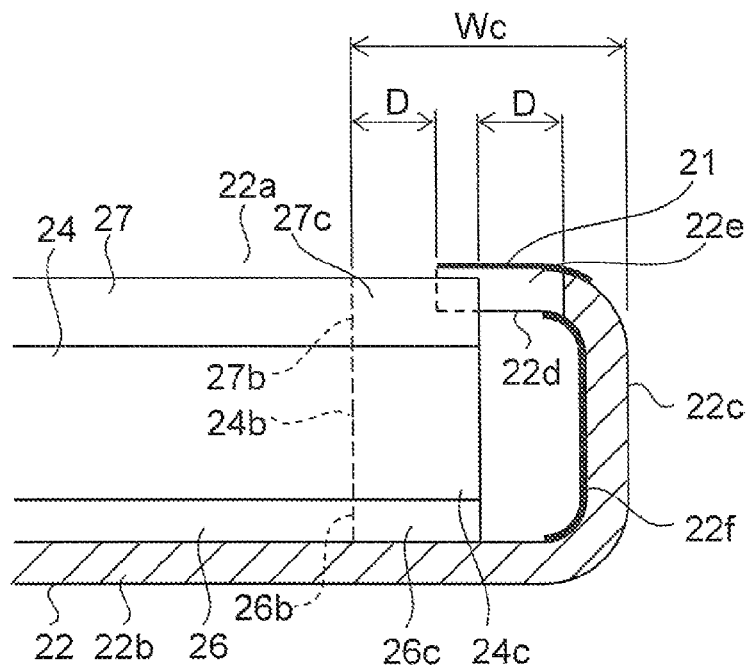
FIG. 8 is a front sectional view showing a backlight of a display apparatus according to a third embodiment of the present invention.

FIG. 8 is a front sectional view showing a main portion of a backlight 20 of a display apparatus 1 according to a third embodiment, showing the same section as FIG. 5 referred to above. For convenience of description, such portions as find their counter parts in the first embodiment illustrated in FIGS. 1 to 5 referred to above are denoted by common reference signs. According to the present embodiment, the upper surface of the optical sheet 27 is disposed above the lower surface of the upper surface portion 22d of the frame 22. In the other respects, the present embodiment is the same as the first embodiment.

Since the upper surface of the optical sheet 27 is disposed above the lower surface of the upper surface portion 22d, the peripheral surface 27b of the optical sheet 27 faces the upper surface portion 22d, and the outer surfaces of the projection portions 24c face inner surfaces of the fitting grooves 22e. Here, clearances D (for example, about 0.2 mm) are formed between the peripheral surface 27b of the optical sheet 27 and an inner edge of the upper surface portion 22d, and between the outer surfaces of the projection portions 24c and the inner surfaces of the fitting grooves 22e.

The clearances D help prevent bending, for example, of the optical sheet 27 due to thermal expansion. Here, the frame width We of the backlight 20 is greater than that of the first embodiment, but it is still possible to form the backlight 20 as a thin backlight.

According to the present embodiment, it is possible to achieve the same advantage as the first embodiment. Furthermore, since the upper surface of the optical sheet 27 is disposed above the lower surface of the upper surface portion 22d, it is possible to slim down the backlight 20.

Fourth Embodiment

Figure 9:
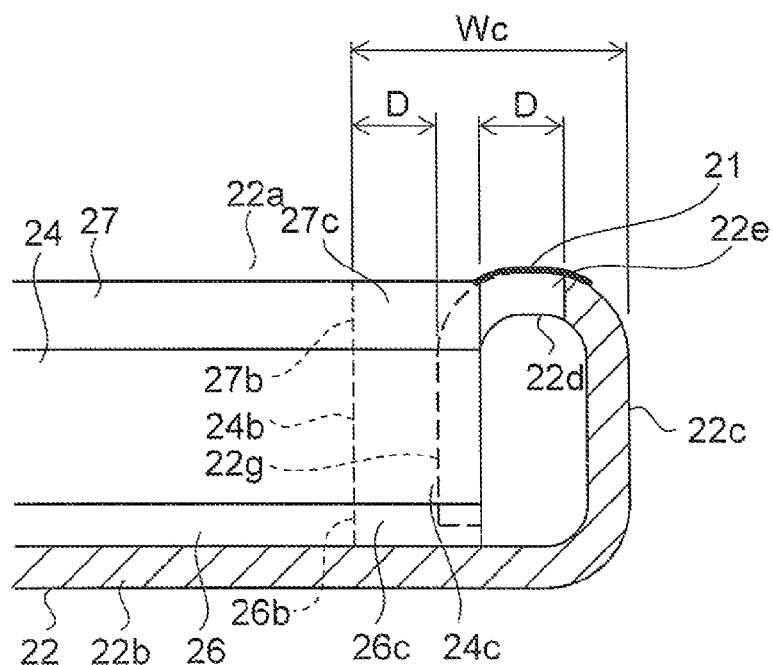
FIG. 9 is a front sectional view showing a backlight of a display apparatus according to a fourth embodiment of the present invention.

FIG. 9 is a front sectional view showing a main portion of a backlight 20 of a display apparatus 1 according to a fourth embodiment, showing the same section as FIG. 8 referred to above. For convenience of description, such portions as find their counter parts in the third embodiment illustrated in FIG. 8 referred to above are denoted by common reference signs. The present embodiment differs from the third embodiment in shape of the frame 22. In the other respects, the present embodiment is the same as the third embodiment.

The frame 22 formed by bending a metal plate includes an inner peripheral portion 22g formed by bending downward the inner edge of the upper surface portion 22d. Here, the peripheral surface 27b of the optical sheet 27 faces an inner surface of the inner peripheral portion 22g with a clearance D (about 0.2 mm, for example) formed therebetween.

According to the present embodiment, it is possible not only to achieve the same advantage as the third embodiment but also to increase the strength of the frame 22 thanks to the provision of the inner peripheral portions 22g.

Fifth Embodiment

Figure 10:
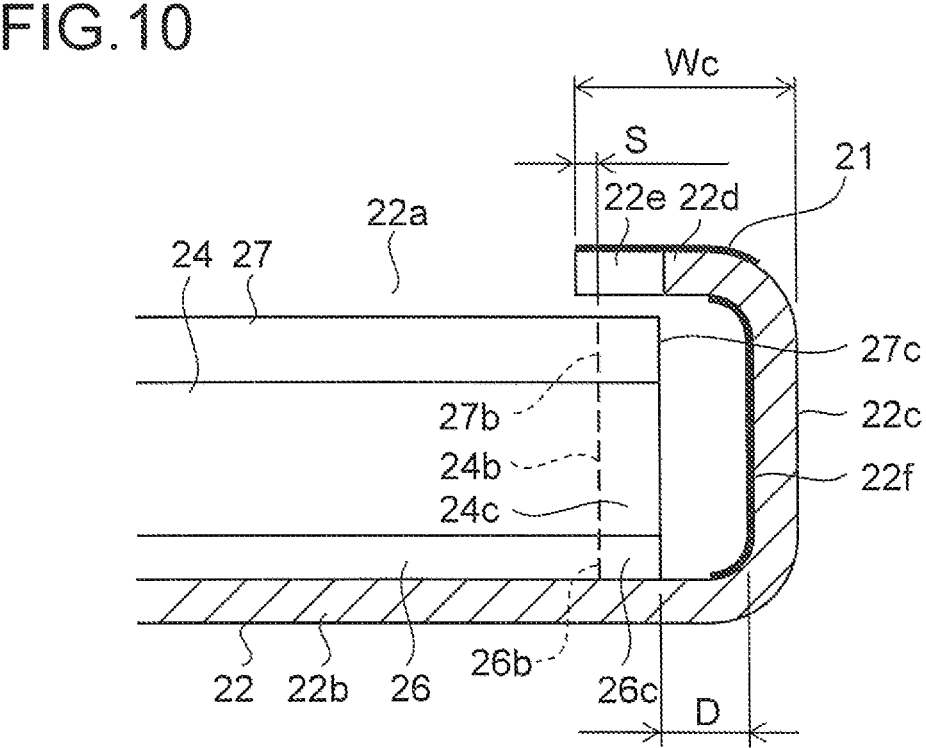
FIG. 10 is a front sectional view showing a backlight of a display apparatus according to a fifth embodiment of the present invention.

FIG. 10 is a front sectional view showing a main portion of a backlight 20 of a display apparatus 1 according to a fifth embodiment, showing the same section as FIG. 5 referred to above. For convenience of description, such portions as find their counter parts in the first embodiment illustrated in FIGS. 1 to 5 referred to above are denoted by common reference signs. According to the present embodiment, the opening 22a of the frame 22 is formed smaller than the outer shape of the light guide plate assembly 23. In the other respects, the present embodiment is the same as the first embodiment.

The frame 22 includes the peripheral surface portion 22c and the upper surface portion 22d formed on the four sides of the frame 22, and the upper surface portion 22d forms the peripheral edge of the opening 22a on its four sides. Moreover, a width of the light guide plate 24 between two sides orthogonal to the light incident surface 24a (see FIG. 2) is formed to be greater than a width of the opening 22a between the two sides. Thereby, on the two sides orthogonal to the light incident surface 24a, the peripheral surface 24b is disposed outwardly from the inner edge of the upper surface portion 22d by a distance S. Likewise, on the two sides orthogonal to the light incident surface 24a, the peripheral surfaces 26b and 27b of the reflection sheet 26 and the optical sheet 27, respectively, are each disposed outwardly from the inner edge of the upper surface portion 22d by the distance S. The distance S is about 0.1 mm, for example.

The light guide plate assembly 23 is pushed into the frame from above the opening 22a. At this time, since the metal plate forming the frame 22 is thin (for example, 0.03 mm to 0.2 mm), the frame 22 curves easily to allow the light guide plate assembly 23 to be installed easily. Furthermore, the reflection sheet 26 and the optical sheet 27 are easily curved, and thus they can be installed to be accommodated in the frame 22 easily.

According to the present embodiment, the peripheral edge of the opening 22a on its four sides is formed by the upper surface portion 22d, and the width of the light guide plate 24 between the two sides orthogonal to the light incident surface 24a is formed to be greater than the width of the opening 22a between the two sides. And the frame 22 can be curved to allow the light guide plate assembly 23 to be installed to be accommodated in the frame 22. Thereby, it is possible to easily install the light guide plate assembly 23 in the frame 22 by pushing it through the opening 22a. Thus, it is possible not only to reduce the man-hours in production of the backlight 20 and the display apparatus 1, but also to avoid sliding of the light guide plate assembly 23 and the frame 22 against each other and obtain uniform illumination light.

Moreover, since the thickness of the metal plate forming the frame 22 is 0.03 mm to 0.2 mm, it is possible to secure the strength of the backlight 20, allow the frame 22 to be curved easily, and achieve a narrower frame.

In the present embodiment, in the same manner as in the second embodiment, the light guide plate assembly 23 may be slid after the projection portions 24c are inserted through the fitting grooves 22e.

INDUSTRIAL APPLICABILITY

The present invention is applicable to apparatuses such as portable terminals (mobile phone terminals, tablet terminals, etc.) that include an edge-light backlight.

LIST OF REFERENCE SIGNS 1 display apparatus
2 housing
5 transparent member
5a curved surface portion
10 display panel
11 pixel substrate
12 counter substrate
13 liquid crystal
14 sealing seal
15, 16 optical sheet
18, 28 FPC
20 backlight
21 double-sided adhesive tape
22 frame
22a opening
22b bottom surface portion
22c peripheral surface portion
22d upper surface portion
22e fitting groove
22f reflection layer
22g inner peripheral portion
23 light guide plate assembly
24 light guide plate
24a light incident surface
24c, 26c, and 27c projection portion
24d light emission surface
25 light source
26 reflection sheet
27 optical sheet

The invention claimed is:

1. A backlight, comprising:
a frame having an opening formed in an upper surface thereof and having a substantially rectangular plan shape;
a light guide plate assembly disposed inside the frame and including a light guide plate and a light source fitted to a light incident surface formed in a peripheral surface of the light guide plate; and
an optical sheet disposed on the light guide plate;
the backlight being configured to guide light incident on the light guide plate from the light source and emit illumination light through the opening,
wherein
the frame is a metal plate with a bent portion and includes: a bottom surface portion facing a rear surface of the light guide plate; a peripheral surface portion standing on a peripheral edge of the bottom surface portion; and an upper surface portion bent from an upper end of the peripheral surface portion to form a peripheral edge of the opening, and an outer shape of the light guide plate assembly is smaller than the opening; and
an upper surface of the optical sheet is disposed below a lower surface of the upper surface portion.

2. The backlight according to claim 1,
wherein
the light guide plate and the optical sheet each have a projection portion projecting from a peripheral surface thereof orthogonal to the light incident surface, the upper surface portion has a fitting groove that fits in the projection portion, and the projection portion inserted through the fitting groove is disposed to face the upper surface portion by sliding the light guide plate assembly.

3. A display apparatus, comprising:
the backlight according to claim 2; and
a display panel disposed to face the opening with a double-sided adhesive tape affixed to the upper surface portion,
wherein
an outer periphery of the fitting groove is disposed inwardly from an outer periphery of the double-sided adhesive tape.

4. The backlight according to claim 2,
wherein
a plurality of projection portions are provided as the projection portion, and the plurality of projection portions are asymmetrically arranged with respect to a center line orthogonal to the light incident surface of the light guide plate.

5. The backlight according to claim 1,
wherein
the metal plate is 0.03 mm to 0.2 mm thick.

6. The backlight according to claim 1,
wherein
the upper surface portion is formed on four sides of the frame.

7. A backlight, comprising:
a frame having an opening formed in an upper surface thereof and having a substantially rectangular plan shape; and
a light guide plate assembly disposed inside the frame and including a light guide plate and a light source fitted to a light incident surface formed in a peripheral surface of the light guide plate,
the backlight being configured to guide light incident on the light guide plate from the light source and emit illumination light through the opening,
wherein
the frame is a metal plate with a bent portion and includes: a bottom surface portion facing a rear surface of the light guide plate; a peripheral surface portion standing on a peripheral edge of the bottom surface portion; an upper surface portion bent from an upper end of the peripheral surface portion to form a peripheral edge of the opening, and an outer shape of the light guide plate assembly is smaller than the opening; and an inner peripheral portion bent downwardly from an inner edge of the upper surface portion.

* * * * *